United States Patent [19]

Wedding

[11] 4,284,686
[45] Aug. 18, 1981

[54] SPECTACLE LENSES TO REDUCE DISCOMFORT FROM APHAKIA AND CERTAIN EYE DISEASES

[75] Inventor: Brent M. Wedding, Corning, N.Y.
[73] Assignee: Corning Glass Works, Corning, N.Y.
[21] Appl. No.: 157,250
[22] Filed: Jun. 9, 1980
[51] Int. Cl.³ .................. C03C 3/26; C03C 3/08; C03C 3/30
[52] U.S. Cl. .................. 428/334; 65/30 R; 65/32; 106/53; 106/54; 106/DIG. 6; 428/913; 428/410; 106/47 Q
[58] Field of Search .......... 106/47 Q, 55, 54, DIG. 6; 65/32, 30 R; 428/913, 410, 334

[56] References Cited

U.S. PATENT DOCUMENTS

| | | | |
|---|---|---|---|
| 3,892,582 | 7/1975 | Simms | 65/32 |
| 3,920,463 | 11/1975 | Simms | 106/DIG. 6 |
| 4,018,965 | 4/1977 | Kerko et al. | 428/913 |
| 4,118,214 | 10/1978 | Wedding | 65/32 |
| 4,125,405 | 11/1978 | Aravjo et al. | 106/54 |
| 4,190,451 | 2/1980 | Hares et al. | 106/DIG. 6 |

*Primary Examiner*—Mark Bell
*Attorney, Agent, or Firm*—Clinton S. Janes, Jr.

[57] ABSTRACT

This invention is concerned with producing glasses suitable for use as spectacle lenses for aphakics or for persons subject to photoretinitis or retinitis pigmentosa. The glasses exhibit near-zero transmittance of radiations having wavelengths shorter than a selected cutoff wavelength ranging about 440–550 nm and the transmittance of the remainder of the visible spectrum is adjusted through the glass demonstrating photochromic behavior. The inventive method contemplates exposing photochromic glass within a narrowly-defined composition range to a strongly-reducing atmosphere at temperatures between about 350°–520° C. for a period of time of at least 12 hours to develop an integral colored surface layer on the glass.

17 Claims, 2 Drawing Figures

SPECTACLE LENSES TO REDUCE DISCOMFORT FROM APHAKIA AND CERTAIN EYE DISEASES

BACKGROUND OF THE INVENTION

Aphakia is the absence of the crystalline lens of the eye. The cause of that disability is normally the result of an operation to remove cataracts from the lens of the eye. The crystalline lens of the eye provides protection to the retina against short wave (ultraviolet) radiation since it acts to strongly absorb radiations having wavelengths shorter than about 420 nm. Hence, a lens exhibiting near-zero transmittance of wavelengths shorter than about 440 nm would be of great benefit to aphakics.

Retinitis has been generally defined as inflamation of the retina. Retinitis may be due to infectious agents (customarily bacteria, less commonly fungi, rarely viruses), mechanical injury of the eyeball (contusion), intense light (photoretinitis), or to chronic progressive damage to the retina (degenerative retinopathy).

Photoretinitis may follow direct observation of intense light sources such as the sun, electrical arcs, welding operations, or even reflected sunlight (snow blindness). The resulting blind spot is central and is usually temporary, but it may be permanent if the exposure is severe enough. It has been discovered that photoretinitis resulting from prolonged exposure to the sun's rays is not caused by thermal injury but, rather, is primarily due to radiations of short wavelengths in the sun's spectrum. Consequently, in like manner to aphakia, a spectacle lens capable of cutting off radiations in the ultraviolet and near-ultraviolet regions of the spectrum would be beneficial. Therefore, a lens exhibiting near-zero transmittance of wavelengths shorter than about 440 nm would also be highly desirable for persons subject to photoretinitis.

Degenerative retinopathy is frequently associated with systemic diseases of the blood vessel system; e.g., arteriosclerosis, hypertensive cardiovascular and kidney diseases, diabetes, leukemia, and anemia. However, retinitis pigmentosa is one type of degenerative retinal infection which has been defined as a hereditary affection inherited as a sex-linked recessive characterized by slowly progressing atrophy of the retinal nerve layers and clumping of retinal pigment followed by attenuation of the retinal arterioles and waxy atrophy of the optic discs. In general, the disease results in the gradual impairment of peripheral and night vision. The rate of progression varies widely in individual patients such that some persons retain useful vision up to 40–50 years of age. Where the disease has progressed rapidly, the loss of peripheral and night vision has caused grave psychological and social problems during childhood and adolescence. There is no known effective treatment for the disease, the growth of pigment cells continuing into and over the inner surface of the retina resulting in ultimate scarring and blindness.

The eye contains two different kinds of photoreceptors, viz., cones and rods. The cones comprise the principal receptors in daylight vision (photopic vision) and the rods constitute the principal receptors in night vision (scotopic vision).

The cones are located generally in the central portion of the retina and permit the recognition of fine detail, presumably because they function largely independently of one another. The cones also permit color vision, i.e., they allow hues and saturation to be distinguished. In the presence of bright light, the eye is most sensitive to radiations at about 555 nm.

In general, the rods are located in the peripheral portions of the retina, there being few if any rods found in the central retina. The rods do not permit the recognition of colors, only shades of gray. Their peak sensitivity is at a wavelength of about 510 nm.

FIG. 1 depicts the relative wavelength response for photopic and scotopic vision.

Published medical research, e.g., "Photic Damage in Retinitis Pigmentosa and a Suggestion for a Protective Device", Werner Adrian and Ingeborg Schmidt, *Journal American Optometric Association*, 46, 380–386, April, 1975, and "Protective Spectacles for Retinitis Pigmentosa Patients", Ronald Everson and Ingebord Schmidt, *Journal American Optometric Association*, 47, 738–744, June 1976, has indicated that a spectacle lens having reduced photopic (luminous) and strongly reduced scotopic transmittance might provide relief to persons suffering from retinitis pigmentosa.

It has been generally accepted that retinal degeneration can be decelerated by preventing both receptors of the retina (cones and rods) from being subjected to bright illumination and great changes in light levels. The continuously decreasing quality of night vision eventually resulting in complete night blindness witnessed in patients suffering from retinitis pigmentosa has led to the conclusion that the rods are degenerating more rapidly and to a greater degree than the cones. Hence, some vision is retained in serious cases of retinitis pigmentosa thereby indicating that some cone function continues even after degeneration of the rods. It is only in the very last stages of retinal degeneration that the surviving cones begin to deteriorate.

Consequently, in addition to preventing the eye from being exposed to bright illumination and substantial changes in light levels, the rods should be more protected than the cones. The photopigment concentration of the rods should be maintained at relatively high values to inhibit the production of bleaching products caused by exposure to light. Therefore, in order to reduce the deposition of worn out cells of the laminar layers of the outer receptor segments which normally are continuously absorbed, protective lenses should transmit light intensities in only such wavelengths that are primarily outside of the absorption range of the rod pigment. Hence, if a spectacle lens could be developed which would permit sufficient light to enter the eye for acceptable vision via the cones alone, it might significantly decrease or even inhibit further retinal degeneration.

Those requirements for reducing retinal degeneration occurring in retinitis pigmentosa could be answered via the use of pure red spectacle lenses. Nevertheless, such lenses would be unsatisfactory from a practical point of view because their monochromaticity does not permit even a moderate degree of natural color vision, e.g., distinction between red and green signal lights, inasmuch as the lenses excessively narrow the spectral information presented to the photoreceptor by the retinal image. Therefore, to impart sufficiently good color fidelity to the lenses, some transmittance in the green portion of the spectrum must be present.

Finally, it would be very beneficial to have the spectacle lenses designed for aphakics and for those persons subject to photoretinitis or retinitis pigmentosa prepared from glasses demonstrating photochromic behavior. Such glasses would act to compensate for differences in indoor and outdoor radiation intensity levels. If desired, polarizing capability can also be incorporated into the spectacle lenses as, for example, by attaching a film of polarizing material to the rear face of the lens. Such action would combine the well-recognized benefits of polarizing eyewear with the advantages of the short wavelength filter characteristics of the present inventive glasses.

OBJECTIVES OF THE INVENTION

The primary objective of the instant invention is to provide a glass suitable for a spectacle lens exhibiting near-zero transmittance of radiations having wavelengths shorter than a specified value while at the same time demonstrating photochromic behavior.

A specific objective is to provide a photochromic glass especially suitable for a spectacle lens for use by aphakics or by persons subject to photoretinitis which exhibits near-zero transmittance of radiations having wavelengths shorter than about 440 nm.

Another specific objective is to provide a photochromic glass especially suitable for a spectacle lens for use by persons subject to retinitis pigmentosa which exhibits near-zero transmittance of radiations having wavelengths shorter than about 550 nm, a photopic transmittance in the faded state no greater than about 25% and no greater than about 10% in the darkened state, and a scotopic transmittance in the faded state no greater than about 10% and no greater than about 5% in the darkened state.

SUMMARY OF THE INVENTION

Those objectives can be achieved by treating photochromic glasses having compositions within certain delineated ranges in a strongly reducing environment at temperatures ranging from about 350°–520° C. to develop an integral color layer in a surface thereof. Because of the desire to enjoy the greatest benefit of photochromic behavior, the back surface only of a spectacle lens will have the colored surface layer. Since the development of color in one surface only requires care in exposing only one surface of the glass to the reducing environment, it has been deemed more practical to soak the entire glass body in the heated reducing atmosphere and thereafter to remove the color layer from the front surface by chemical or mechanical means.

U.S. Pat. Nos. 3,892,582 and 3,920,463 disclose the production of colored photochromic glasses by firing silver halide-containing photochromic compositions in reducing atmospheres. Those patents teach temperatures of 300°–600° C. for times varying between 4–15 minutes.

United States Application Ser. No. 95,435, filed Nov. 19, 1979 in the names of N. F. Borrelli and B. M. Wedding, discloses a method for producing surface-colored, photochromic glass articles by firing such articles in reducing atmospheres at temperatures between about 200°–450° C. for such times that the glasses exhibited absorption peaks at longer wavelengths than prior art glasses and surface colors varying from orange, red, purple, and blue are developed. No periods of firing times are claimed but the working examples therein cited times ranging from 15 minutes at 420° C. to 16 hours at 200° C.

United States Application Ser. No. 95,434, filed Nov. 19, 1979 in the name of N. F. Borrelli, describes a method for preparing selectively tinted, photochromic glass lenses. The method contemplates two basic steps:

(1) a silver halide-containing, photochromic glass lens is heated to 200°–650° C. in a reducing environment to develop a colored surface layer therein having a depth not exceeding about 100 microns; and then (2) at least a portion of that colored surface layer is removed via chemical means. In general, only a selected area of the colored surface layer will be removed such that a pattern or color gradient will be developed in the surface. As noted therein, the colors produced customarily reside in a very thin surface layer, commonly about 10–100 microns in depth. Therefore, removal of the surface layer does not substantially affect the refractive power of a lens surface or the surface quality thereof.

No time limitation is specified for operability of the inventive method. The working examples however, range from a dwell period of 0.5 hour at a temperature of 550° C. to an interval of one hour at a temperature of 350° C.

As was observed above, the composition of the photochromic glass plays a substantive role in achieving the desired cutoff of radiations having wavelengths below 550 nm. U.S. Pat. No. 4,190,451 discloses glasses which are particularly suitable for use in the inventive method. Such glasses consist essentially, expressed in weight percent on the oxide basis, of about 0–2.5% $Li_2O$, 0–9% $Na_2O$, 0–17% $K_2O$, 0–6% $Cs_2O$, 8–20% $Li_2O + Na_2O + K_2O + Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ varies between about 0.55–0.85 and the weight ratio Ag:(Cl+Br) ranges between about 0.65–0.95. Those glasses may also optionally contain up to about 10% total of other ingredients selected from the group in the indicated proportions of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F. Finally, those compositions are compatible with the conventional glass colorants selected from the transition metal oxides and rare earth metal oxides. Hence, up to about 1% total of transition metal oxide colorants and/or up to 5% total of rare earth metal oxide colorants may be included to modify the color of the bulk glass.

The time of exposure to which the glass will be subjected is dependent upon the objective to be achieved. Two factors must be borne in mind when determining the time of exposure: (1) the development of color takes place more rapidly at higher temperatures; and (2) less reaction time is required to impart to a glass a cutoff of radiations of shorter wavelengths than of longer wavelengths. Stating this second factor in different and more specific terms, it requires a longer reaction time to develop a glass demonstrating near-zero transmittance of radiations having wavelengths shorter than about 550 nm than a glass displaying near-zero transmittance of radiations having wavelengths shorter than about 440 nm. For example, an exposure period of about 12 hours in an atmosphere of pure hydrogen at temperatures in the 500°–520° C. interval may be sufficient to cause the glass to exhibit near-zero transmittance to radiations having wavelengths no greater than about 440 nm whereas soaking times of a week (168 hours) or even more may be demanded at temperatures of 350°–375° C. to produce a glass manifesting near-zero transmittance to wavelengths shorter than about 550 nm.

One final inherent glass property which must also be taken into consideration is the temperature-viscosity characteristics thereof at the reducing firing temperature employed. Thus, the annealing points of the above-cited preferred glass compositions are in the vicinity of 500° C. Accordingly, temperatures greatly in excess of that temperature hazard thermal deformation of the glass shape and/or deleterious effects upon its utility as a photochromic spectacle lens.

In summary, the present invention provides a glass having an integral colored surface layer and exhibiting near-zero transmittance of radiations having wavelengths shorter than a selected cutoff which may range from about 440-550 nm. Furthermore, the invention provides means for adjusting the transmittance in the remainder of the visible portion of the radiation spectrum through photochromic behavior and, optionally, through the addition of colorants. The luminous transmittance of the glasses in the faded state is a function of the selection of cutoff wavelength and the content of added colorants, if any. Hence, it is well-recognized that luminous transmittance decreases with increasing cutoff wavelength and colorant concentration.

In general, because of the broad absorption band that imparts the intrinsic bluish coloration produced by cobalt, that transition metal is the most preferred added colorant. However, United States Application Ser. No. 113,797, filed Jan. 21, 1980 in the name of George B. Hares, notes the addition of 1-50 parts per million of palladium and/or gold to the photochromic glass compositions of U.S. Pat. No. 4,190,451 to confer a brown coloration to the glass in the darkened state and, optionally, in the faded state. Such glass compositions are also operable in the instant invention.

The inventive method comprises subjecting the glass to a highly reducing atmosphere at a temperature between about 350°-520° C. for a time sufficient to cause the development of an integral colored surface layer at least capable of cutting off essentially all radiations shorter than about 440 nm (at least about 12 hours with an environment of pure hydrogen) and, where it is desired to cut off essentially all radiations shorter than about 550 nm, exposure times of at least about 96 hours and up to 168 hours and more may be required to insure essentially complete cutoff. The choice of exposure time is based upon the temperature of the reducing environment and the cutoff wavelength desired. The depth of the colored surface layer increases slowly with increasing exposure time. In general, the depths of the surface layers operable with the inventive glasses range between about 25-100 microns.

Pure hydrogen gas constitutes the most efficient reducing atmosphere although other agents such as cracked ammonia, mixtures of CO and $CO_2$, and forming gas (blends of hydrogen and nitrogen) might be used. Such environments will obviously require longer exposure periods to achieve the colored surface layer produced by an atmosphere of pure hydrogen.

DESCRIPTION OF THE PREFERRED EMBODIMENTS

Table I records approximate compositions in weight percent of photochromic glasses marketed commercially for eyeglass lenses by Corning Glass Works, Corning, N.Y. under Code Nos. 8111 and 8113, and which are encompassed within the disclosure of U.S. Pat. No. 4,190,451, supra.

TABLE I

|  | 8111 | 8113 |
|---|---|---|
| $SiO_2$ | 55.8 | 56.46 |
| $Al_2O_3$ | 6.48 | 6.19 |
| $B_2O_3$ | 18.0 | 18.15 |
| $Li_2O$ | 1.88 | 1.81 |
| $Na_2O$ | 4.04 | 5.52 |
| $K_2O$ | 5.76 | 5.72 |
| $ZrO_2$ | 4.89 | 4.99 |
| $TiO_2$ | 2.17 | 2.07 |
| CuO | 0.011 | 0.0068 |
| Ag | 0.24 | 0.254 |
| Cl | 0.20 | 0.210 |
| Br | 0.13 | 0.169 |
| $Co_3O_4$ | — | 0.03 |

The presence of cobalt ions in Code 8113 glass imparts a bluish hue thereto.

Uncut polished plano lens pairs of both of the above glasses were heated in a flowing 100% hydrogen atmosphere in an electrically-fired tube furnace for the times and temperatures reported in Table II, infra. The color layer on the front side of each lens (a depth of about 50-100 microns) was removed by polishing. The lenses were then cut and chemically strengthened via immersion for 16 hours in a bath of molten $KNO_3$ and $NaNO_3$ operating at a temperature of 400° C. to cause an exchange of $Li^+$ and $Na^+$ ions in the glass surface with $Na^+$ and $K^+$ ions from the salt bath. This strengthening is necessary to insure that the lenses will survive the Federal Food and Drug Administration's (FDA) drop ball test (a ⅝" diameter steel ball dropped from a height of 50").

Figure 1:
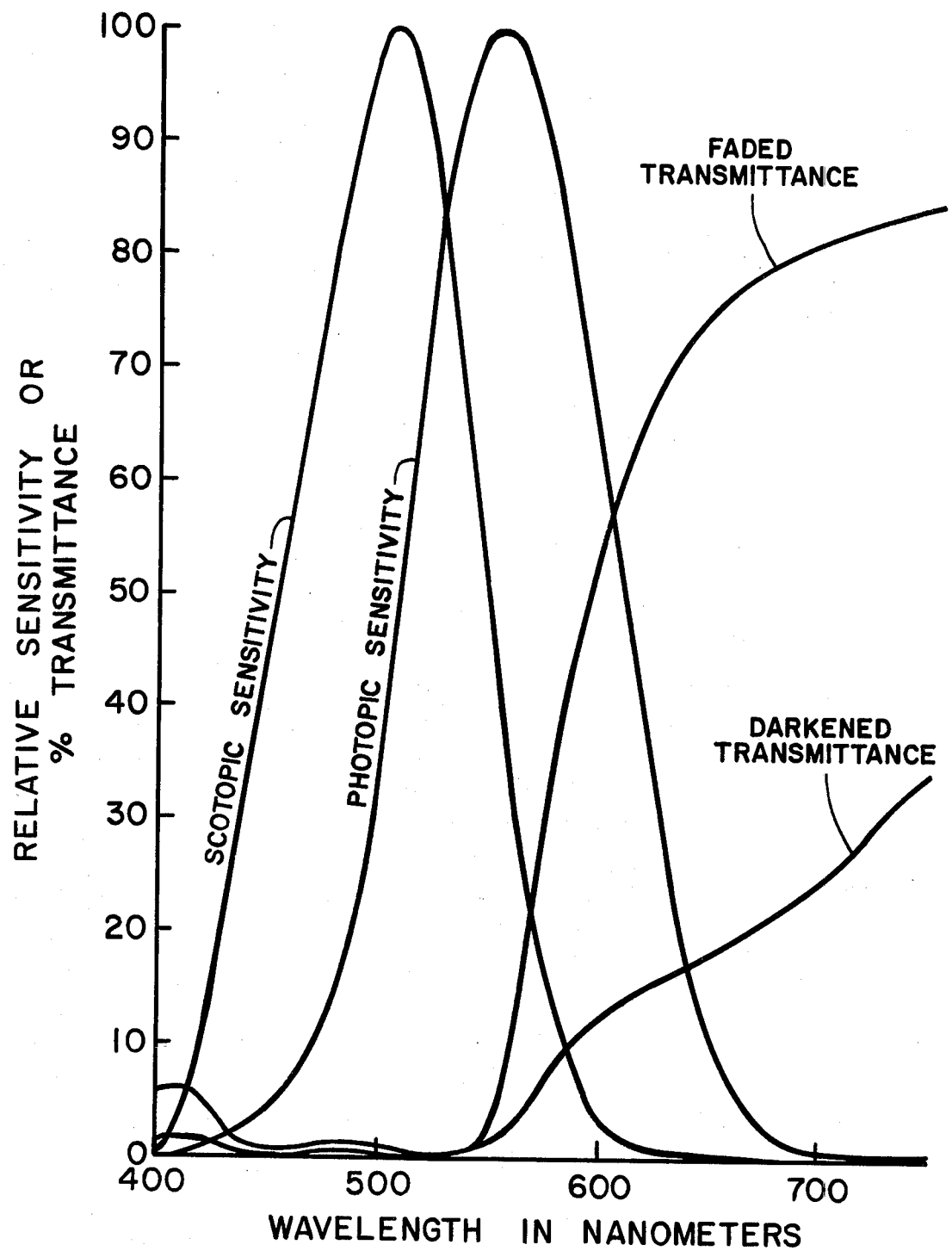
FIG. 1 graphically depicts the relative wavelength response for photopic and scotopic vision and the spectral transmittance curves in the faded state and darkened state measured on one glass composition suitable for use as a spectacle lens for a person subject to retinitis pigmentosa.

The spectral transmittance of the lenses in both the darkened state and faded state was determined spectrophotometrically. FIG. 1 depicts the spectral transmittance curves in the darkened and faded states for the lenses produced from Code 8111 glass in Run IV recorded in Table II, and FIG. 2 records the spectral transmittance curves in the darkened and faded states for the lenses produced from Code 8111 glass in Run V listed in Table II. As can be observed from the curves, the glass resulting from the long term exposure to hydrogen exhibits near-zero transmittance of radiations having wavelengths shorter than about 550 nm. In contrast, the relatively short term exposure of Run V yielded a glass demonstrating near-zero transmittance of radiations having wavelengths shorter than about 440 nm. In general, the luminous transmittance of Code 8111 glass at room temperature after the inventive reducing firing treatment will be in the vicinity of 72% in the faded state and about 17% in the darkened state. The luminous transmittance of a 2 mm-thick lens of Code 8113 glass at room temperature after a similar inventive reducing firing treatment will be about 54% in the faded state and about 13% in the darkened state.

The photopic and scotopic transmittances (in %) of each glass were calculated for 1931 CIE Illuminant C and the ratio therebetween determined. Table II reports the production parameters for the heat treatments and the calculated transmittance values. The photopic and scotopic transmittances were not calculated for Run V since the cutoff of the glass is at a much shorter wavelength than the peak sensitivities of those vision regions.

TABLE II

| Run | Glass | Temperature | Time | Photopic | Scotopic | Ratio |
|---|---|---|---|---|---|---|
| I | 8111 | 410° C. | 47 hrs. | 43.4% | 10.6% | 4.1 |
| II | 8113 | 410° C. | 108 hrs. | 26.7% | 5.9% | 4.5 |
| III | 8113 | 390° C. | 160 hrs. | 14.2% | 1.4% | 10.4 |
| IV | 8111 | 390° C. | 110 hrs. | 21.3% | 2.6% | 8.2 |
| V | 8111 | 495° C. | 18 hrs. | — | — | — |

Figure 2:
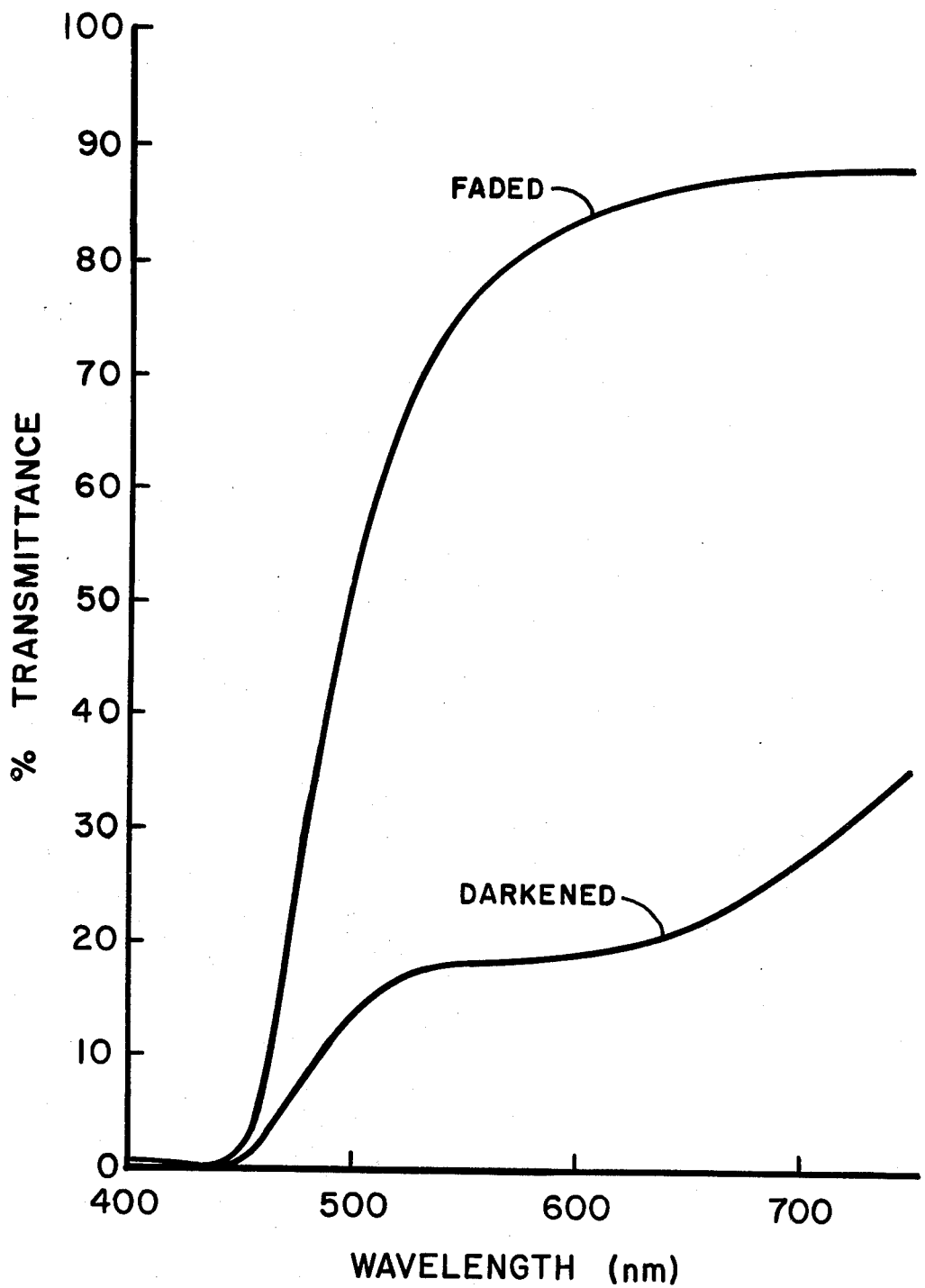
FIG. 2 graphically illustrates the spectral transmittance curves in the faded state and in the darkened measured on one glass composition suitable for use in a spectacle lens for an aphakic or for a person subject to photoretinitis.

Table II in conjunction with FIGS. 1 and 2 clearly indicates the shift in cutoff wavelength that can be promoted by the inventive method. Thus, Run IV yielded a glass which would be useful for a person subject to retinitis pigmentosa whereas Run V produced a glass suitable for an aphakic or for a person subject to photoretinitis. The lenses prepared from Code 8113 glass illustrate that it is possible to adjust the luminous transmittance with a bulk glass colorant if an otherwise acceptable lens is too light.

Furthermore, Table II illustrates the relationship of time and temperature to achieve the desired final product. Hence, as would be expected, lower heat treating temperatures demand longer exposure times to produce an operable product. Temperatures between about 380°–420° C. are preferred for treating glasses designed for use in cases of retinitis pigmentosa because the wavelength cutoff secured within that temperature interval appears to be more desirable. Glasses for use with persons subject to retinitis pigmentosa will desirably demonstrate a photopic:scotopic transmittance ratio of at least 4:1 with higher ratios therebetween (8:1–12:1) and scotopic transmittances of about 2.5% and less being deemed the most preferred.

I claim:

1. A photochromic glass article especially suitable for spectacle lenses having an integral colored surface layer and exhibiting near-zero transmittance of radiations having wavelengths shorter than a selected cutoff wavelength ranging between about 440–550 nm, said glass consisting essentially, expressed in weight percent on the oxide basis, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ varies between about 0.55–0.85 and the weight ratio Ag:(Cl+Br) ranges between about 0.65–0.95.

2. A photochromic glass article according to claim 1 also including, as optional components, 1–50 parts per million Pd and/or Au, and/or up to 1% transition metal colorants, and/or up to 5% rare earth metal colorants, and/or up to 10% total of other ingredients selected from the group in the indicated proportions of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F.

3. A photochromic glass article according to claim 2 wherein cobalt oxide constitutes the transition metal colorant.

4. A photochromic glass article according to claim 1 wherein said integral colored surface layer has a depth of about 25–100 microns.

5. A photochromic glass article according to claim 1 especially suitable for spectacle lenses for aphakics or for persons subject to photoretinitis exhibiting near-zero transmittance of radiations having wavelengths shorter than about 440 nm.

6. A photochromic glass article according to claim 1 especially suitable for spectacle lenses for persons subject to retinitis pigmentosa exhibiting near-zero transmittance of radiations having wavelengths shorter than about 550 nm, a photopic transmittance in the faded state no greater than about 25% and no greater than about 10% in the darkened state, and a scotopic transmittance in the faded state no greater than about 10% and no greater than about 5% in the darkened state.

7. A photochromic glass article according to claim 6 demonstrating a photopic:scotopic transmittance ratio of at least 4:1.

8. A photochromic glass article according to claim 1 having polarizing capability incorporated therein.

9. A method for making a photochromic glass article especially suitable for spectacle lenses having an integral colored surface layer and exhibiting near-zero transmittance of radiations having wavelengths shorter than a selected cutoff wavelength ranging between about 440–550 nm which comprises subjecting a photochromic glass consisting essentially, expressed in weight percent on the oxide basis, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxide:$B_2O_3$ varies between about 0.55–0.85 and the weight ratio Ag:(Cl+Br) ranges between about 0.65–0.95, to a strongly reducing atmosphere at a temperature between about 350°–520° C. for a period of time of at least 12 hours to develop an integral colored surface layer therein.

10. A method according to claim 9 wherein said photochromic glass also includes, as optical components, 1–50 parts per million Pd and/or Au, and/or up to 1% transition metal colorants, and/or up to 5% rare earth metal colorants, and/or up to 10% total of other ingredients selected from the group in the indicated proportions of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F.

11. A method according to claim 10 wherein cobalt oxide constitutes the transition metal colorant.

12. A method according to claim 9 wherein said integral surface layer has a depth of about 25–100 microns.

13. A method according to claim 9 wherein said strongly reducing atmosphere consists essentially of hydrogen.

14. A method according to claim 9 wherein said temperature ranges between about 380°–400° C.

15. A method according to claim 9 wherein said time ranges between about 12–168 hours.

16. A method according to claim 9 wherein said glass is subjected to said strongly reducing atmosphere for a period of time of at least about 96 hours to achieve near-zero transmittance therein of radiations having wavelengths shorter than about 550 nm, a photopic transmittance in the faded state no greater than about 25% and no greater than about 10% in the darkened state, and a scotopic transmittance no greater than about 10% in the faded state and no greater than about 5% in the darkened state so as to render said glass especially suitable for spectacle lenses for persons subject to retinitis pigmentosa.

17. A method according to claim 9 including the step of incorporating polarizing capability to said glass.

* * * * *